Dec. 2, 1952      W. BARR ET AL      2,619,715

BONDING TOGETHER OF METALS

Filed Aug. 26, 1947

Inventors
William Barr +
John Erskine
By
Young, Emery & Thompson
Attorneys

Patented Dec. 2, 1952

2,619,715

UNITED STATES PATENT OFFICE 2,619,715

BONDING TOGETHER OF METALS

William Barr, Hamilton, and John Erskine, Burnside, Scotland, assignors to Colvilles Limited, Glasgow, Scotland, a British company Application August 26, 1947, Serial No. 770,654
In Great Britain January 7, 1947

2 Claims. (Cl. 29—189)

This invention relates to the bonding together of metals in order to form composite metal articles, for example the bonding of a relatively expensive alloy steel surface to a less expensive iron or steel base, although the invention is not restricted to the bonding together of such metals, or in fact to the bonding together of ferrous metals. The invention is especially applicable, however, to the cladding of mild steel plates with stainless steel or heat resisting steel. The invention is applicable inter alia to the production of various bonded composite metal articles, for example, rolled or forged plates, bars or sections.

In the production of composite articles in which alloy steels or steels of different compositions are to be bonded together by hot rolling or forging, one of the difficulties involved is in obtaining a completely effective and continuous weld or bond between the different metals. In the case of high alloy steels, for example, such as stainless steel or heat resisting steel, the presence of a thin surface film, generally considered to be an oxide, which is present even on surfaces which appear to be clean, is the cause of the difficulty in obtaining an efficient weld or bond.

Hitherto, various methods have been proposed for obtaining an effective weld or bond between steels or alloy steels. For example, one such process is based on the electrolytic deposition of a layer of iron on the metal surface concerned from which the said surface film has been previously removed.

In accordance with the present invention we provide a method of bonding a first metal to a second metal, comprising depositing a surface layer of steel on the surface of the first metal by a fusion welding process, and bonding said first metal to said second metal by hot rolling or forging said deposited layer to said second metal.

Herein and in the claims when referring to deposition of a layer of steel by fusion welding we prefer to use mild steel but instead may use a low alloy steel and such materials are intended to be covered in using the word "steel" in this sense.

We have found by experiment that while preventing effective forge welding, the presence of the surface film does not prevent fusion welding of these metals by such processes as the electric arc or gas welding.

Preferably after deposition of the layer on the first metal, for example the surface metal, a further layer of steel plate is welded on top of said deposited layer, and the first metal so treated is rolled or forged to a reduced gauge prior to bonding with the second metal, for example, the metal forming the base.

In a modification the second metal has previously deposited on the surface thereof a layer of steel by a fusion welding process, the bonding of the first and second metals thus being effective between the two deposited layers of steel by hot rolling or forging.

The invention is applicable as regards the first metal to all metals to which a surface layer of steel can be united by a fusion welding process, with or without subsequent application of steel plate thereto as aforesaid, while as regards the second metal it is also applicable to all metals to which a surface layer of steel can be united by a fusion welding process, but as regards the second metal it is primarily applicable to all metals which can be united to the said fusion welded or deposited layer on a first metal, with or without said steel plate thereon, by hot forging or rolling.

We have found it satisfactory to deposit the layer of steel by electric arc or by gas welding.

The invention is thus applicable to the bonding together of, inter alia, nickel, Monel (registered trade-mark) metal, or other ferrous or non-ferrous metals whereon a fusion welded steel deposit may be effected as aforesaid.

More than two metals may be bonded together, intermediate steel fusion weld deposits being provided as aforesaid on the surfaces of the different metals to be bonded, except where the metal itself is a mild steel or low alloy steel.

Since the deposition of a mild steel coating by the electric arc or gas welding processes on a large surface of, for example, a relatively expensive alloy steel, may be an expensive and tedious procedure, the above method may effect substantial economies by applying the said deposited layer at an intermediate stage in production of the final metallic plate, that is to say, at the slab stage, thus minimising final distortion and decreasing the surface area on which the deposit is to be made.

Further important economies are effected by the discovery that a single run of weld-deposited mild steel may be adequate in many cases at this intermediate stage (the slab stage), the necessary total thickness of mild steel being built up by superimposing the layer of mild steel plate, which, in subsequent rolling or forging, will weld or bond without difficulty to the underlying fusion weld deposited mild steel, the surface of which is previously prepared by grinding flat.

Preferably for this purpose we use mild steel plates in small sizes, about 1 foot square, with the surface in contact with the fusion weld deposit descaled by sand blasting or pickling, or grinding. These plates may be of any predetermined thickness and are laid one deep on the mild steel fusion weld deposit on the relatively expensive alloy steel (or equivalent) slab with a suitable gap all round, which gap is subsequently filled in with mild steel weld metal, thus anchoring each plate securely to the underlaying mild steel deposit, the whole being finished flush.

The alloy steel slab, having a surface layer of mild steel, built up as described above to any required thickness, is thereafter hot rolled or forged to a plate of convenient thickness, usually about ½ inch thick. In this manner an alloy steel plate is obtained with one surface uniformly covered with a relatively thin layer of mild steel, thus providing, in an economical manner, a suitable material for the subsequent production by hot rolling or forging by any of the well-known methods, of composite plates, bars or sections, comprising the aforesaid alloy steel plate bonded to the mild steel (or equivalent) base.

An example of the invention will now be described as applied to the bonding of a stainless steel cladding to a mild steel base, with reference to the accompanying drawings, whereon:

Figure 1:
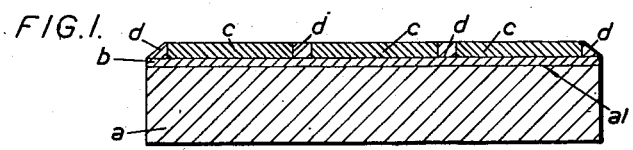
Fig. 1 is a sectional elevation on the line I—I of Fig. 2, showing a stainless steel slab with mild steel plates welded thereto.

In the example shown in the drawings, $a$ represents a flat slab of stainless steel alloy, containing approximately 18% chromium and 8% nickel and measuring 4' 9" by 3' by 6" thick, which had one surface $a_1$ descaled by sand blasting. Over the entire sand-blasted surface $a_1$ a single run layer $b$ of mild steel fusion weld metal approximately one-eighth inch deep was deposited in the usual manner using the metallic arc process with an ordinary mild steel coated electrode.

Figure 2:
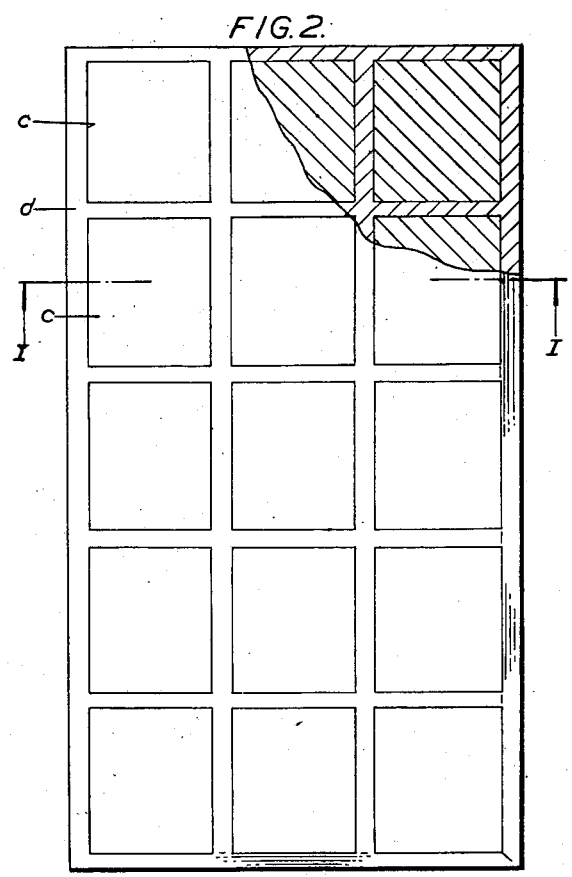
Fig. 2 is a plan view of Fig. 1.

The deposited layer of mild steel was then ground flat, after which a layer of mild steel plates $c$ (Figs. 1 and 2) each approximately 11" by 10" by ½" thick, with sand-blasted surfaces, were superimposed on the stainless steel slab $a$ with its weld metal layer $b$, leaving a gap approximately ½" wide between each plate, which gaps were subsequently built up flush with mild steel fusion weld metal deposited thereon as at $d$. This slab (herein called the "plated" slab) thus has on one surface a total thickness of mild steel of five-eighths of an inch approximately.

The "plated" slab was thereafter heated to between 1150° C. and 1180° C., and rolled in a plate mill down to a ½ inch thick plate 36' by 4' 6" having on one surface a layer of mild steel approximately .026 inch thick. Thus, the cost per square foot of coating stainless alloy steel plate with a welded layer of mild steel for bonding purposes is very considerably reduced by this procedure since 14.25 square feet of surface area of the "plated" slab provided 162 square feet of ½ inch plate. Moreover, the cost could have been reduced still further by making the plated slab of greater thickness.

Figure 3:
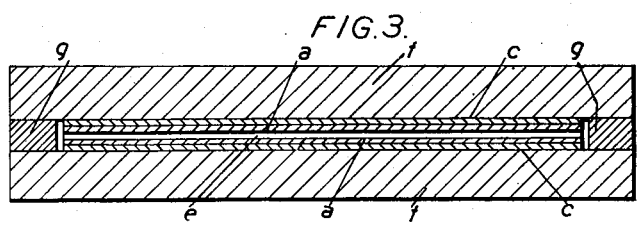
Fig. 3 is a sectional elevation showing the manner in which a mild steel base and a stainless steel cladding are finally bonded together.

From the above ½ inch alloy steel plate, two pieces approximately 2' 6" by 2' 6" were cut, and after descaling the surfaces by sand-blasting, the two plates were placed in juxtaposition (see Fig. 3) with the mild steel coated surfaces $c$ to the outside and the stainless steel cladding $a$ on the inside, and with a thin layer $e$ of inert refractory material (magnesium oxide) spread uniformly between the two surfaces in contact to prevent sticking. These two ½ inch plates were then welded together around their peripheries using an austenitic electrode, and the whole was placed between two mild steel slabs $f$ each 3 feet by 3 feet by 3 inches thick having their inside surfaces machined. This double sandwich was sealed by welding at $g$ with mild steel electrodes around the four edges in accordance with the well-known method for producing clad steels, leaving a clearance of ⅛ inch all round with the periphery of the ½ inch plate in order to allow for differential expansion thereof.

The double sandwich prepared as outlined above, was heated to between 1150° C. and 1180° C. and rolled in a plate mill to 1½ inch thick plate. Immediately after rolling, the plate was annealed at 650° C. Thereafter the side scrap was removed by shearing, and as a result two mild steel plates were obtained, each approximately 8 feet by 3 feet by ¾ inch thick, having on one surface approximately one-eighth inch of stainless steel. Exhaustive tests carried out on these two plates, including tensile tests, cold bend tests, twist tests, and micro examination, showed that an effective bond was obtained uniformly over the whole area of the two plates.

It has been found that the mild steel fusion weld coated on the initial stainless steel slab becomes reduced to a fine bonding film which may in some cases require to be only a few thousandths of an inch thick.

As a result of the present invention, a method is provided which requires none of the relatively expensive electro-plating plant, while it is simple to operate and provides a high grade cladding on the base. The invention is, inter alia, useful for a large range of purposes to which cladded steel is applicable, also to composite armour such as bullet-proof plates and armour plate.

We claim:

1. A method of bonding a cladding of corrosion resisting chromium alloy steel to a mild steel base, which method comprises fusion-welding a layer of mild steel to a slab of said alloy steel, abrading the exposed surface of said mild steel layer in order to flatten and de-scale said surface, heating the composite slab thus produced and rolling it so as to reduce it in thickness to the form of a plate, de-scaling the exposed surface of said layer so that it presents a clean outer surface, applying said plate back-to-back against a similarly produced plate with a parting substance between these plates and the fusion-welded layers outermost, applying mild steel slab bases to said outer surfaces of said mild steel layers so that said alloy-steel plates are sandwiched between said bases, which are sufficiently greater in area to leave projecting margins around said alloy-steel plates, inter-welding said margins to produce a composite slab, heating said composite slab and rolling it down to plate thickness, cutting off said margins and packing, and separating the two mild steel bases each in the form of a plate with a thin surface layer of the chromium alloy steel bonded by a fine film of mild steel to the associated base.

2. A method according to claim 1 which also includes the step of welding an additional layer of mild steel to the exposed surface of the mild steel layer to reinforce same.

WILLIAM BARR.
JOHN ERSKINE.

REFERENCES CITED

The following references are of record in the file of this patent:

UNITED STATES PATENTS

| Number | Name | Date |
|---|---|---|
| 125,245 | Absterdam | Apr. 2, 1872 |
| 1,679,518 | Fowle | Aug. 7, 1928 |
| 1,886,615 | Johnson | Nov. 8, 1932 |
| 1,896,411 | Maskrey | Feb. 7, 1933 |
| 1,950,871 | Trembour | Mar. 13, 1934 |
| 2,133,292 | Gordon | Oct. 18, 1938 |
| 2,160,559 | Orr | May 30, 1939 |
| 2,191,470 | Hopkins | Feb. 27, 1940 |
| 2,226,403 | Hopkins | Dec. 24, 1940 |
| 2,219,957 | Kerr | Oct. 29, 1940 |
| 2,209,290 | Watts | July 23, 1940 |
| 2,288,184 | Dodson | June 30, 1942 |
| 2,414,511 | Dyar | Jan. 21, 1947 |
| 2,438,759 | Liebowitz | Mar. 30, 1948 |
| 2,468,206 | Keene | Apr. 26, 1949 |
| 2,473,686 | Keene | June 21, 1949 |